May 30, 1967 SAKAE FUJIMOTO 3,322,427

MAGNETIC SHEET RECORDING AND REPRODUCING APPARATUS

Filed July 25, 1961

7 Sheets-Sheet 4

May 30, 1967 SAKAE FUJIMOTO 3,322,427

MAGNETIC SHEET RECORDING AND REPRODUCING APPARATUS

Filed July 25, 1961 7 Sheets-Sheet 6

May 30, 1967 SAKAE FUJIMOTO 3,322,427

MAGNETIC SHEET RECORDING AND REPRODUCING APPARATUS

Filed July 25, 1961 7 Sheets-Sheet 7

United States Patent Office 3,322,427

Patented May 30, 1967

3,322,427

MAGNETIC SHEET RECORDING AND REPRODUCING APPARATUS

Sakae Fujimoto, Chofu, Japan, assignor to Kabushiki Kaisha Ricoh and Nihon Denki Bunka Kogyo Kabushiki-Kaisha, both of Tokyo, Japan, both corporations of Japan Filed July 25, 1961, Ser. No. 126,567

Claims priority, application Japan, July 26, 1960, 35/32,982

1 Claim. (Cl. 274—4)

This invention relates generally to a magnetic recording and reproducing apparatus in which a magnetic transducer head is adapted to be spirally moved with respect to a magnetic record sheet, and more particularly to facilitate the manipulation of such apparatus.

According to one aspect of the invention there is provided an operating device for a magnetic recording and reproducing apparatus comprising a pair of push buttons each having two functions. In a preferred embodiment of the invention one of the push buttons is arranged to be first depressed to initiate the rotational movement of a rotatable disk and to be again depressed after the release thereof to stop the rotational movement of the disk while the other push button is arranged to be first depressed to close a record switch to permit an electric current to flow through a magnetic transducer and to be again depressed after the release thereof to open the switch thereby to interrupt the current flowing through the transducer. In its normal state the other push button serving to close the record switch functions to maintain a reproducing switch in closed position. Therefore, the reproducing operation can be performed by depressing only the push button serving to initiate the rotational movement of the rotary disk.

According to another aspect of the invention there is provided a magnetic recording and reproducing apparatus including a magnetic transducer head associated with a rotary disk and adapted to be automatically returned back to its original position after the recording or reproducing operation has been completed by the rotation of the disk.

The invention will become more readily apparent from the following detailed description taken in conjunction with the accompanying drawings in which.

Figure 1:
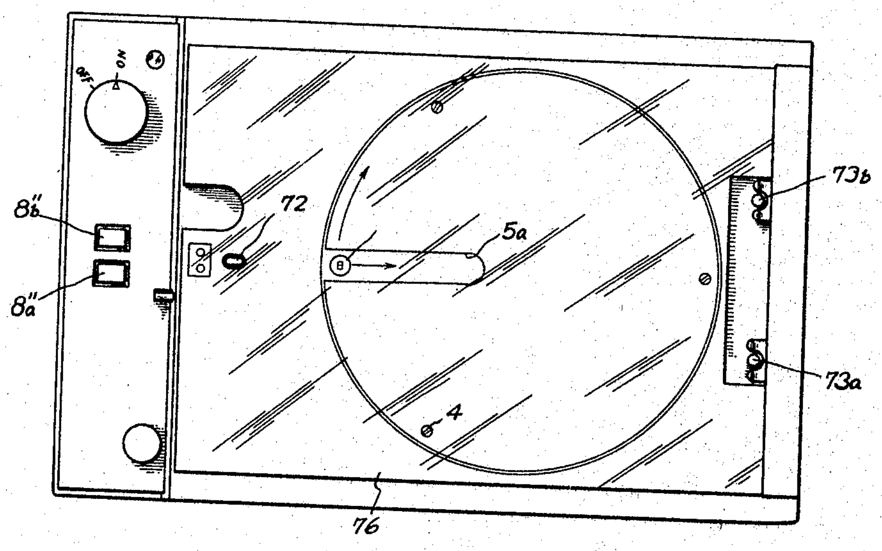
FIG. 1 is a plan view of a magnetic recording and reproducing apparatus embodying the teachings of the invention.

Referring now to the drawings, a housing for a magnetic recording and reproducing apparatus embodying the teachings of the invention and shown in FIG. 1 includes therein a base plate 1 horizontally carried by any suitable means. Mounted on the upper and lower surfaces of the base plate 1 are a driving motor and various mechanical elements of driving and controlling mechanisms as will be described hereinafter. Above the base plate 1 there is provided a circular disk 3 with a pendent periphery having as an axis of rotation a longitudinal shaft 2 secured to the base plate. A circular plate 5 is disposed concentrically with and above the disk 3 and rigidly secured to the same through a suitable number of supporting rods 4 which, in turn are secured to the disk 3 on its upper surface. As shown in FIG. 1, the upper plate 5 is arranged to be fitted into a circular opening formed on the top plate of the housing.

Figure 2:
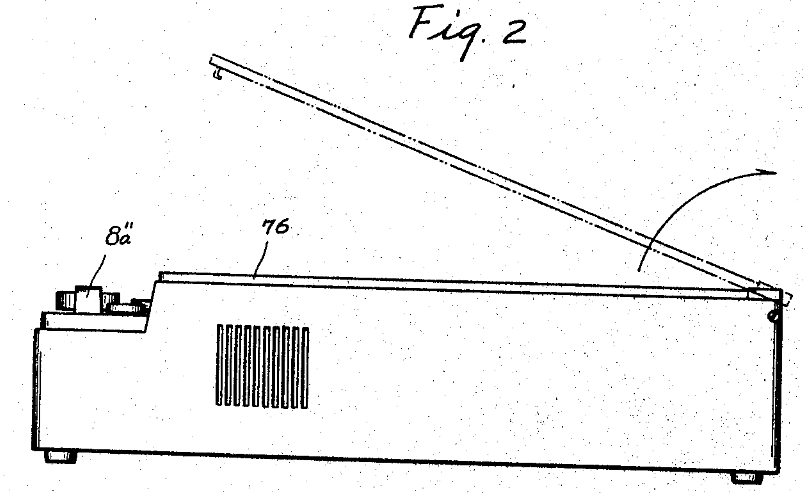
FIG. 2 is a side elevational view of the apparatus illustrated in FIG. 1.
Figures 3, 10, 11, 15:
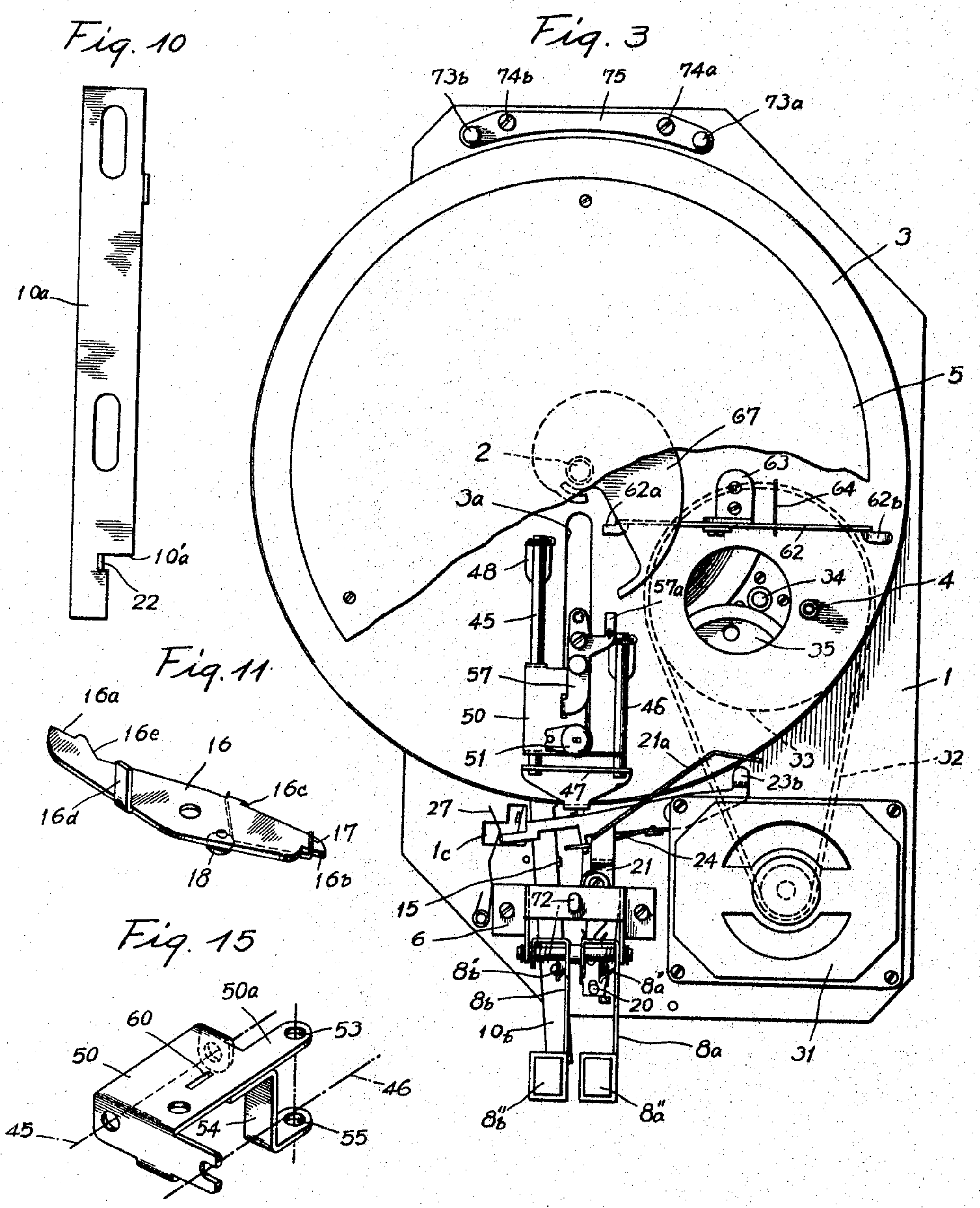
FIG. 3 is in plan view of mechanisms disposed inside a housing for the apparatus with the housing omitted.
FIG. 10 is a plan view of a locking strip slidably mounted on a base plate.
FIG. 11 is a perspective view of a rocking lever pivotably mounted on a base plate on its rear surface.
FIG. 15 is a perspective view of a support member for supporting the transducer head.

On the upper surface of the base plate 1 and on the lower end portion thereof as viewed in FIG. 3 is mounted a bearing 6 made of a sheet material and including a pair of juxtaposed bell cranks 8a and 8b carried thereon. The bell cranks tend to be rotated in a clockwise direction as viewed in FIG. 6, by the action of springs 9 carried by the pivot of the bell cranks and include pendent arms 8a' and 8b' engaging a pair of locking strips as will be described hereinafter respectively and the other arm ends at which push button-like key members 8a'' and 8b'' are mounted respectively. As shown in FIGS. 1 and 2 the key members 8a'' and 8b'' normally project beyond the top plate of the housing to be accessible externally of the apparatus.

Figure 5:
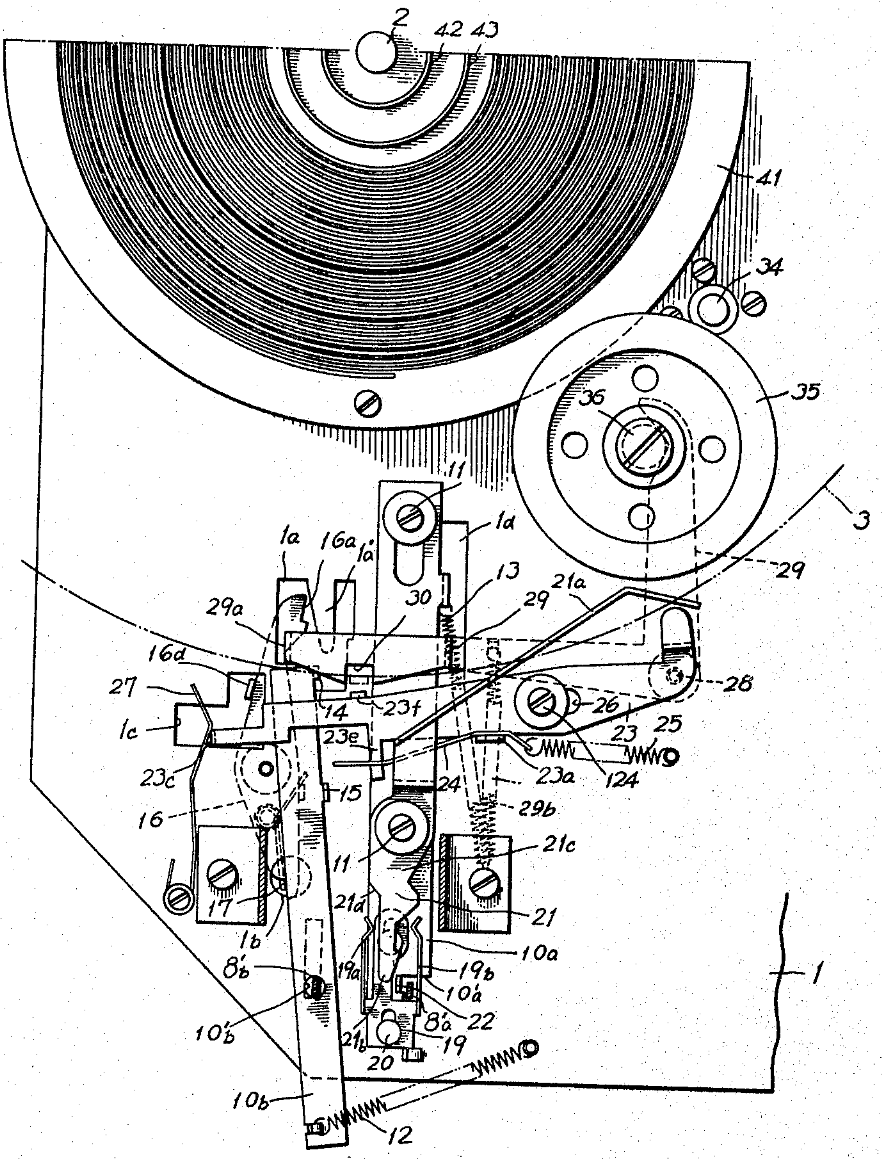
FIG. 5 is a plan view of mechanical elements mounted on a base plate with a rotary disk including provided thereon a magnetic transducer head being omitted.

The base plate includes a pair of locking strips 10a and 10b slidably mounted thereon and interlocking with the bell cranks 8a and 8b respectively. As shown in FIG. 10, one of the locking strips 10a is provided with a pair of elongated openings and mounted by flat head rivets 11 to the base plate for longitudinally sliding movement. Therefore, the elongated openings cooperate with the rivets to limit the longitudinal movement of the one locking strip 10a. As shown in FIG. 5, the other locking strip 10b is provided with a circular opening 10b' adapted to engage the pendent arm end 8b' of the bell crank 8b and tends to be rotated about said arm end in a counterclockwise direction as viewed in FIG. 5, by the action of a spring 12. Also as shown in FIG. 5, the pendent arm end 8a' of the bell crank 8a engages a notch 10a' formed on the right-hand edge of the locking strip 10a near the rear end portion thereof remote from the center of the base plate while the pendent arm end 8b' of the bell crank 8*b* engages the circular opening 10*b'* on the locking strip 10*b*. Therefore, if the push button for either of the bell cranks will be depressed the corresponding locking strip will be forced forwardly. The locking strip 10*b* is normally maintained in its inoperative position illustrated in FIG. 5 by the action of the spring 9 engaging the associated bell crank. On the other hand, the locking strip 10*a* is normally maintained in its inoperative position by the action of the spring 9 and further by the action of a spring 13 shown in FIGS. 5 and 6.

The locking strip 10*b* is provided with a pendent portion 14 on the right-hand edge at the forward end thereof near the center of the base plate and positioned in a locking strip-guiding opening 1*a* formed on the base plate as will be described later. The locking strip 10*b* is provided with an upright portion 15 on the right-hand edge and functions to push a leaf spring 24 as will be described hereinafter. The guiding opening 1*a* formed on the base plate 1 includes a guiding piece 1*a'* projecting from one end of the same and serves to guide the pendent portion 14 of the locking strip 10*b*. Thus, if the push button 8*b''* will be depressed to advance the locking strip 10*b* then the pendent portion will be moved forwardly while sliding along one or the other of the opposed side edges of the guiding piece 1*a'*.

On the rear side of the base plate 1 and adjacent the forward end of the locking strip 10*b* is journalled a fulcrum of a lever 16 as shown in FIG. 5. As shown in more detail in FIG. 11, the lever 16 includes one end portion where a stepped portion 16*a* is formed and the other end portion having a straight edge 16*b*. A spring 17 includes an intermediate portion wound about a pendent pin 18 secured to the lever 16, one end portion engaging a pendent portion 16*c* thereof and the other end portion bent upwardly and pressed against the straight edge 16*b*. The other end portion of the spring 17 then extends through and projects beyond a circular opening 1*b* formed on the base plate 1 as shown in FIG. 5. That portion of the spring 17 projecting beyond the base plate is brought into contact with the left-hand edge of the locking strip 10*b*. The spring 17 is chosen so as not to be strained through the locking strip 10*b* by the action of the spring 12 which, in turn serves to rotate the strip in the counterclockwise direction as previously described. The lever 16 is provided on the side edge with an upright portion 16*d* extending through a rectangular opening 1*c* formed on the base plate and projecting beyond the same.

Figures 7, 8, 16, 17, 20:
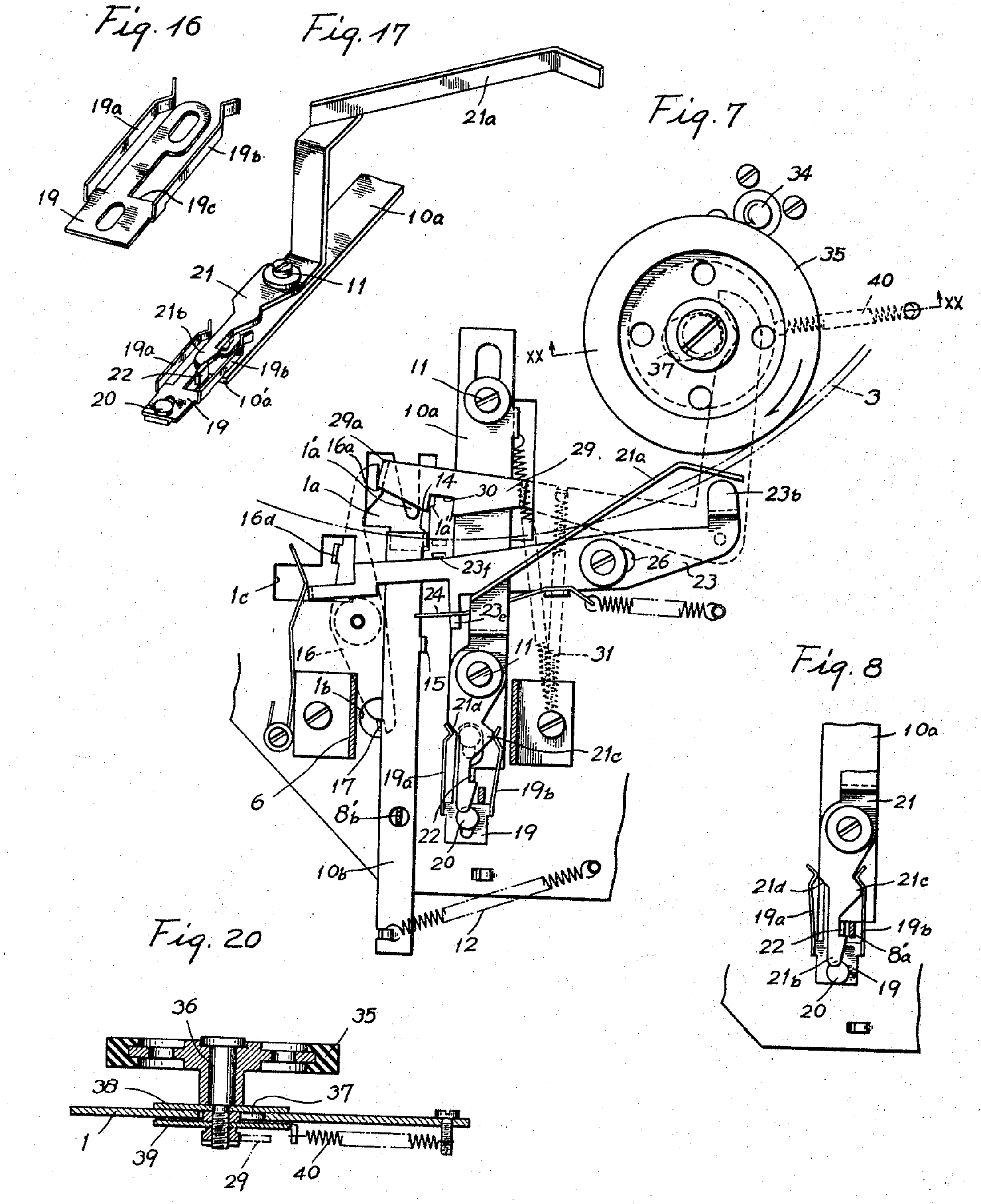
FIG. 7 is a plan view illustrating the mechanical elements of FIG. 5 in another state obtained by the depression of a key member.
FIG. 8 is a fragmental plan view of a locking strip slidably mounted on a base plate.
FIG. 16 is a perspective view of a leaf spring mounted at one end of the locking strip illustrated in FIG. 10.
FIG. 17 is a perspective view of a hooked arm pivotably mounted on the locking strip illustrated in FIG. 10.
FIG. 20 is a longitudinal section taken along the line XX—XX of FIG. 7.

Mounted on the upper surface of the rear end portion of the locking strip 10*a* is a forked leaf spring 19 by a rivet 20 for frictionally sliding movement on the base plate. As shown in FIG. 16, the leaf spring 19 includes a pair of elongated resilient legs or strips 19*a* and 19*b* opposed to each other and having end portions bent outwardly at an angle respectively. Thus the leaf spring 19 is in frictional engagement with the locking strip 10*a* so that the sliding movement of the locking strip 10*a* relative to the base plate causes the leaf spring 19 to be moved together with the same. However, if only the leaf spring 19 is subject to a driving force while the locking strip 10*a* is maintained stationary then the former is allowed to slide on the latter within the limits provided by an elongated opening formed on the leaf spring 19.

Figures 6, 13:
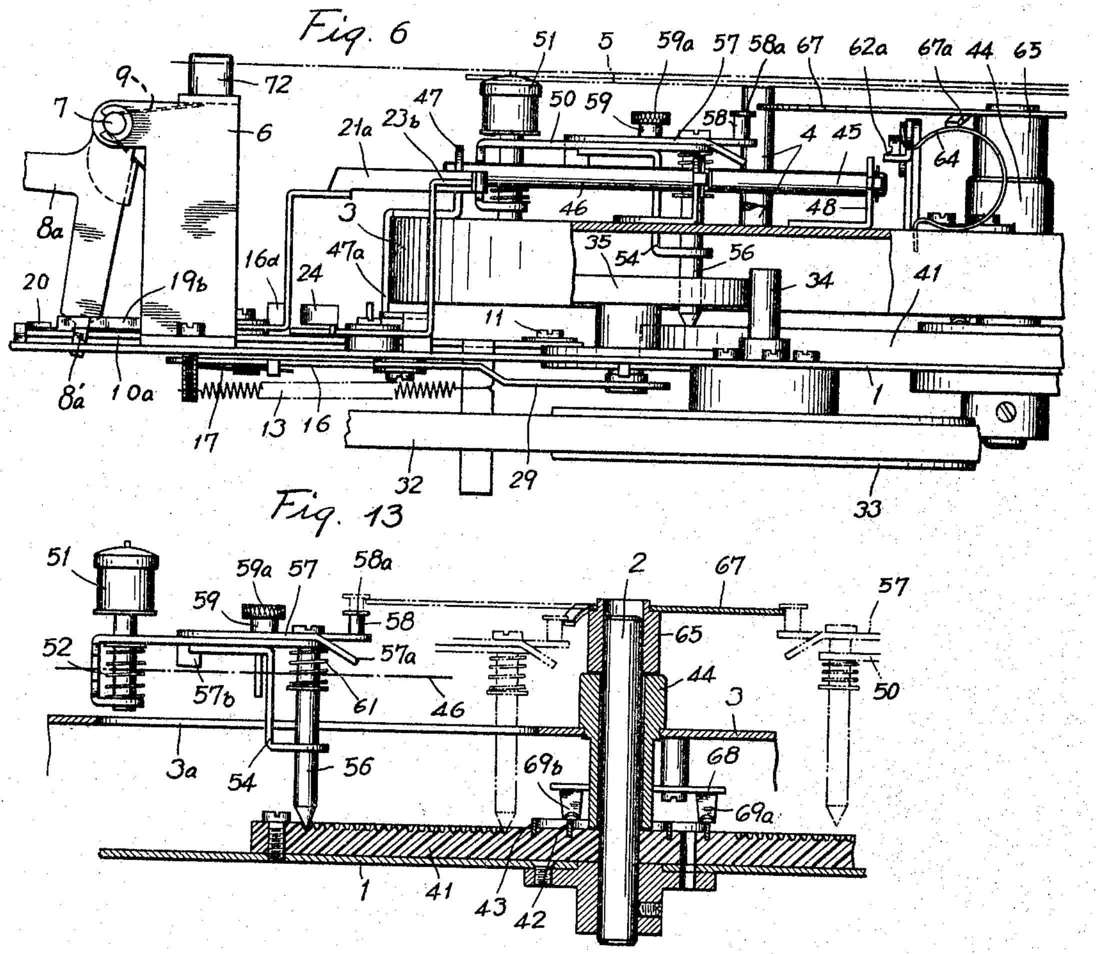
FIG. 6 is a side elevational view of the mechanical elements of FIG. 5 as viewed from the righthand side.
FIG. 13 is a side elevation illustrating the manner in which a magnetic transducer head is displaced with certain components not pertinent to the movement of the head being omitted.

The flat head rivet 11 by which the locking strip 10*a* is slidably carried on the base plate 1 serves also to pivotally mount a hooked arm 21 on the locking strip in overlapping relationship. As shown in FIG. 17, the hooked arm 21 includes an upright portion having a horizontally extending part at the free end of which an arm portion 21*a* is secured extending obliquely to the horizontally extending part. As shown in FIG. 6, the extending arm portion 21*a* is positioned above the rotary disk 3 and includes a free end portion bent outwardly with respect to the disk (see FIG. 5). That portion of the hooked arm 21 overlapping the locking strip 10*a* is provided at its free end with a hook 21*b* adapted to engage an upright portion 22 (FIG. 17) formed adjacent the notch 10*a'* of the locking strip 10*a*. Thus, if the locking strip 10*a* is pushed forwardly from a position illustrated in FIG. 5 to a position illustrated in FIG. 7 then the hook 21*a* will engage the upright portion 22 (see FIGS. 7 and 9). That portion of the hooked arm 21 where the hook 21*b* is formed is provided on the righthand edge with a projection 21*c* and on the lefthand edge with an inclined edge portion 21*d*. The projection 21*c* and the inclined edge portion 21*d* are constructed and arranged such that, with the locking strip 10*a* moved forwardly, the legs 19*a* and 19*b* of the forked leaf spring 19 have deflecting forces applied to them respectively.

As best seen in FIG. 5, a lever 23 is rockably and slidably mounted on the base plate 1 by a flat head rivet 124 positioned on the righthand side of the locking strip 10*a* with the lever traversing the locking strips 10*a* and 10*b*. The lever 23 includes on the lower side an upright portion 23*a* which, in turn includes a leaf spring 24 secured to the side of the same. The leaf spring 24 includes a free end portion extending in the lefthand direction as viewed in FIG. 5 which is adapted to be subject to a pushing action provided by the upright portion 15 formed on the righthand edge of the locking strip 10*a* (see FIG. 9). The other or righthand end of the leaf spring 24 engages one end of a spring 25 having the other end suitably secured to the base plate 1. The spring 25 tends to turn the lever 23 about the axis 124 in a counterclockwise direction as viewed in FIG. 4 and serves to pull the lever 23 rightwards as also viewed in the same figure. Thus if the lever 23 is pushed leftwards against the action of the spring 25 the same is allowed to be displaced leftwards to an extent determined by an elongated opening 26 on the lever 23. The lever 23 also includes one end portion (or the righthand end portion as viewed in FIG. 5) bent upwardly at a right angle to the main body of the same and having a free extremity extending horizontally. As shown in FIG. 5, the extremity 23*b* is opposed to the end portion of the extending arm portion 21*a* of the hooked arm 21.

Figures 4, 19:
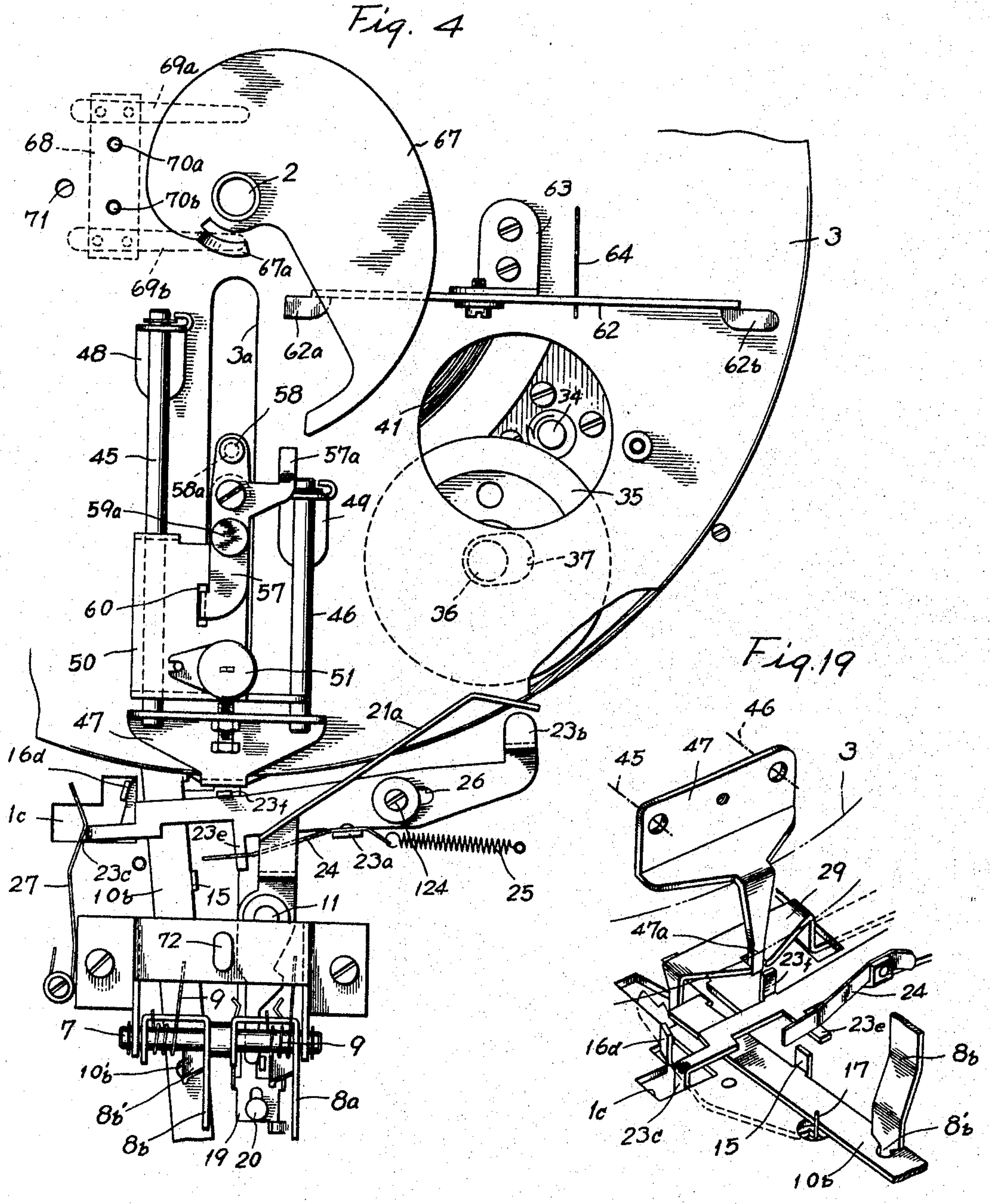
FIG. 4 is a plane view, on an enlarged scale of a part of the mechanisms illustrated in FIG. 3.
FIG. 19 is a perspective view illustrating the manner in which mechanical elements mounted on the base plate engage the rotary disk.

The lefthand end portion of the lever 23 is reduced in width and includes at its extremity a pendent part 23*c* bent downwardly at substantially a right angle to the same. The pendent part 23*c* is positioned in the rectangular opening 1*c* formed on the base plate and pushed against one side of said opening by virtue of the action of the spring 25. Further the pendent part 23*c* engages a spring 27 having one end suitably secured to the base plate and having the other end portion of angle shape extending above the rectangular opening 1*c*. The angle shaped end portion of the spring 27 is arranged such that, if the lever 23 is turned about its axis 24 clockwise the pendent part 23*c* will be displaced over the top of the angle shaped portion (see FIG. 12). The lever 23 is provided with an upright portion 23*f* on the upper edge as shown in FIG. 4 and adapted to be struck against a protrusion on the periphery of the rotatory disk as will be described hereinafter. Further the lever 23 includes a projecting rod 23*e* formed on and at substantially a right angle to the opposite or lower edge thereof and adapted to abut against the upright portion 15 disposed on the righthand edge of the locking strip 10*b*. Thus, if the lever 23 is pushed toward the left as viewed in FIG. 9, the projecting rod 23*e* will abut against the upright portion 15 to thereby rock the locking strip 10*b*.

Figures 14, 18:
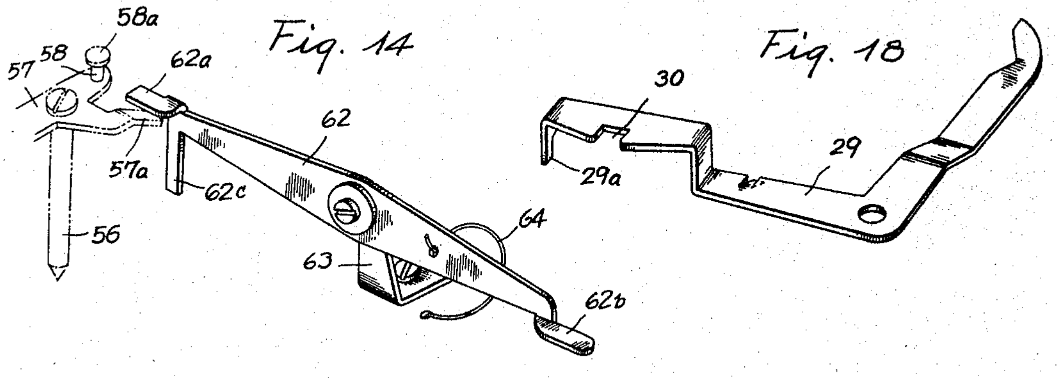
FIG. 14 is a perspective view of a control lever on the rotary disk cooperating with a transducer head for interrupting recording or reproducing operation.
FIG. 18 is a perspective view of a bell crank pivotably mounted to the base plate on its underside.

As shown by dotted line in FIG. 5, a shaft 28 is secured to the rear surface of the base plate 1 on the righthand side of the shaft 124 and apart away from the same and includes pivotally mounted thereto a bell crank 29 as will now be described. As shown in FIG. 18, the bell crank 29 comprises one arm having a stepped portion positioned at a higher level than the other arm and slightly projecting beyond the base plate through a rectangular opening 1*d* formed on the same. The stepped portion has an outer edge projecting at an angle and provided on the top with a notch 30 adapted to engage a pendent portion 47a of the rotary disk. This arrangement insures that the rotary disk is caused to be stopped at a predetermined fixed position to be maintained in an inoperative state. The stepped portion of the bell crank 29 includes a free end portion 29a bent downwardly and adapted to abut against the forward end of the locking strip 10b (see FIGS. 5 and 19). The edge portion of the free end 29a opposite to that abutting against the forward end of the locking strip 10b is brought into contact with an inclined edge portion 16e formed on one end portion of the lever 16 (see FIG. 11). Therefore, the end 29a of the bell crank 29 is sandwiched between the forward end of the locking strip 10b and the inclined edge portion 16e of the lever 16 pivotally mounted to the base plate on the rear surface.

The bell crank 29 includes the other arm having a free end portion on one side of which a V-shaped recess is formed for holding therein a shaft of a frictional transmission wheel as will be described hereinafter. As shown in FIG. 7, the bell crank 29 tends to be rotated in a counterclockwise direction as viewed in the same figure, by the action of a spring 29b.

Referring now to FIG. 3, a driving motor 31 is rigidly secured on the base plate 1 at the lower righthand corner as viewed in the same figure. The motor 31 includes a rotational shaft extending through the base plate and serving to transmit power to a driving shaft as will be described hereinafter. A belt 32 (see FIGS. 3 and 6) engaging the rotational shaft of the motor 31 acts to transmit the rotational movement of the shaft to a pulley 33 suitably mounted on the rear side of the base plate for rotational movement and also serving as a fly wheel. The pulley 33 includes a rotational shaft 34 extending through and projecting beyond the base plate.

Referring now to FIGS. 7 and 20, the base plate 1 is provided with a tilted elongated opening 37 in which a longitudinal shaft 36 of a frictional transmission wheel 35 is carried. The wheel 35 is adapted to be driven by the driving shaft 34. As shown in FIG. 20, a pair of circular plates 38 and 39 are secured to the lower end portion of the longitudinal shaft 36 so as to loosely sandwich the base plate 1. As shown in FIGS. 7 and 20, a compression spring 40 includes one end secured to a portion of the periphery of the lower circular plate 39 as viewed in FIG. 20 and the other end suitably secured to the base plate on the extension of the major axis of the elongated opening 37 (see FIG. 7). Thus the longitudinal shaft 36 tends to be pulled toward the external end of the opening 37.

As shown in FIG. 5, the righthand side of the lower end of the longitudinal shaft 36 abuts against the V-shaped recess on the end portion of the bell crank 29. Since the bell crank 29 tends to be rotated in a counterclockwise direction as previously described, the same is pulled toward the inside of the opening 37 against the action of the compression spring 40. Under these circumstances, the frictional transmission wheel 35 is slightly separated away from the driving shaft 34 as shown in FIG. 5. However, if the compression spring 40 will pull the longitudinal shaft 36 toward the outer side of the opening 37 as shown in FIG. 7 then the driving shaft 34 is brought into contact with the frictional transmission wheel 35 and simultaneously the transmission wheel 35 presses against the internal surface of the pendent periphery of the rotary disk 5 on which a magnetic transducer head is carried.

Referring now to FIGS. 5 and 13, a circular disk 41 is horizontally secured on the base plate 1 around the base portion of a longitudinal shaft 2 rigidly secured to the base plate and carries thereon a spiral groove having the center of convolution coinciding with the center of the longitudinal shaft 2. The disk 41 is made of any suitable electrically insulating material and includes on the central portion a pair of metallic annular members 42 and 43 rigidly secured to and concentrically with the same. The metallic annular members 42 and 43 provide terminals for connecting electrical leads to the magnetic transducer head on the rotary disk as will be described hereinafter and an amplifier (not shown) for the present apparatus.

As shown in FIG. 13, the longitudinal shaft 2 rigidly secured to the base plate 1 includes loosely fitted thereon a hub 44 to which, in turn the rotary disk 3 is secured. Mounted on the rotary driven disk 3 are a pair of parallel cross rods 45 and 46 of different lengths by means of a common bearing 47 and the respective bearings 48 and 49. A head supporting member 50 as shown in FIG. 15 is mounted to the cross rods 45 and 46 for longitudinally sliding movement and resiliently supports a magnetic transducer head 51 through an expansion spring 52 as shown in FIG. 13.

The head supporting member 50 includes a projection 50a (see FIG. 15) extending longitudinally of the cross rods 45 and 46 and including a circular bore 53 formed at its end. As shown in FIGS. 13 and 15, the projection 50a includes a pendent piece 54 secured on the lower side of the base portion and having its free end portion bent horizontally. This free end portion extends through a radially elongated opening 3a formed on the disk 3 (see FIG. 13). The pendent piece 54 is provided at its end with a circular bore 55 having the same size as the circular bore 53 and aligned with it.

Loosely fitted into the pair of circular bores 53 and 55 is a circular bar 56 having its lower end of conical shape and its upper end secured to a movable member 57 on the head supporting member 50. The movable member 57 includes an arm 57a extending from its righthand edge as viewed in FIG. 4 and disposed at substantially a right angle to the same. As shown in FIGS. 13 and 14, the arm 57a includes an elbow portion bent obliquely and downward.

Referring again to FIG. 13, the movable member 57 includes rivets 58 and 59 secured on the upper surface at the end and the middle respectively. The rivet 58 includes a flange 58a at the top while the rivet 59 includes a head 59a capable of being grasped with fingers of an operator. Further the movable member 57 is provided on the side edge of the lefthand end portion (as viewed in FIG. 13) with a pendent portion 57b which, in turn is loosely fitted into an elongated opening 60 (FIGS. 12 and 15) formed in the middle portion of the head supporting member 50 on the upper surface.

Normally the circular bar 56 is depressed by an expansion spring 61 disposed around the same and the lower conical end portion of the circular bar 56 has its apex engaging the spiral groove carried on the disk 41. Therefore, the rotational movement of the rotary disk 3 in a clockwise direction as viewed in FIG. 4 causes the bar 56 to be progressively displaced toward the center of rotation while revolved.

On the righthand portion as viewed in FIG. 4 the disk 3 includes a lever 62 pivotably mounted thereto through a bracket 63 suitably secured to the disk. As shown in detail in FIG. 14, the lever 62 includes flat projections 62a and 62b at both ends respectively with the projection 62a having a downward extension 62c. The righthand arm of the lever 62 as viewed in FIG. 4 engages one end of an expansible spring 64 whereby the lever tends to be rotated about its fulcrum in a counterclockwise direction as viewed in the same figure. The downward extension or pendent portion 62c is pressed against the rotary disk 3 by the action of the spring 64 to thereby maintain the lever 62 substantially horizontal. When the arm portion 57a of the movable member 57 mounted on the head supporting member is moved toward the center of rotation together with the transducer head 51 the flat projection 62a on the lefthand arm of the lever 62 is adapted to land at the arm portion 57a as shown in FIG. 14. On the other hand, the flat projection 62b at the external end of the lever 62 is passed above the extension 21*a* (FIG. 4) of the hooked arm 21 during rotation of the rotatory disk 3. In this case, the lever 62, however is tilted about its pivot against the action of the spring 64. With the projection 62*b* displaced slightly downward, and if the rotatory disk is being rotated, the projection 62*b* will kick off the angle-shaped portion at the end of the extension 21*a* of the hooked arm 21.

Secured to the top of the longitudinal shaft 2 on which the disk 3 is mounted is a hub 65 (see FIG. 13) to which a cam plate 67 having a gradually evolute periphery is rigidly secured. The cam plate 67 includes a circularly arcuate piece 67*a* forming that portion of the operating periphery nearest to the longitudinal shaft 2. The circularly arcuate piece 67*a* includes its outer periphery of circular shape having its center at the center of the shaft 2 and extends obliquely and downwardly. When the flat head rivet 58 disposed on the movable member 57 together with the transducer head has been displaced adajacent the center of the convolution the tilted arcuate piece 67*a* is adapted to land the flange 58*a* of the flattened rivet 58.

A rectangular plate 68 as shown by dotted line positioned on the lefthand side of the longitudinal shaft 2 in FIG. 4 is made of any suitable electrically insulating material and provided at both ends with a pair of metallic contact members 69*a* and 69*b* extending at substantially a right angle to the same. The insulating plate 68 is mounted on the rear surface of the rotatory disk 3 by a pair of supporting rods 70*a* (see FIGS. 4 and 13). The contact members 69*a* and 69*b* secured to the plate 68 includes their respective ends contacting the upper surfaces of the metallic annular members 42 and 43 secured concentrically to the circular disk 41 on which the spiral groove is formed (see FIG. 13). Provided on the rotary disk 3 on which the plate 68 is secured and adjacent the plate 68 is a small opening 71 through which electrical leads from the transducer head extend until they are connected to the contact members 69*a* and 69*b* respectively.

The bearing 6 secured to the base plate 1 on the lower portion as viewed in FIG. 3 is provided on the middle portion with a projection 72 and the upper portion of the base plate 1 is provided with a pair of spaced projections 73*a* and 73*b*. All these projections serve to place a magnetic record sheet (not shown) in position by fitting them into the corresponding openings formed on the sheet. As shown in FIG. 1, the projections 72, 73*a* and 73*b* project beyond the top surface of the housing for the apparatus and are substantially at a common level. The projections 73*a* and 73*b* are secured to both ends of a cross member 75 mounted to a pair of supporting bars 74*a* and 74*b* which, in turn are secured to the base plate.

The operation of the apparatus thus far described is as follows: Disposed on the top surface of the housing as shown in FIGS. 1 and 2 is a magnetic record sheet with the magnetized surface thereof in contact with the top surface and then a hinged cover 76 of a transparent material is closed. The projections 72, 73*a* and 73*b* are fitted into the corresponding openings on the magnetic record sheet to thereby prevent any movement of the latter relative to said top surface. It is assumed that various movable components mounted on the base plate are in their respective inoperative positions illustrated in FIGS. 3 and 5 and that the transducer head is positioned at the outer extremity of its stroke along the pair of cross rods 45 and 46. Under these circumstances, the push button 8*a*″ (see FIG. 3) for the bell crank 8*a* can be depressed to advance the locking strip 10*a*. At the time, the locking strip 10*a* is moved forwardly together with the forked leaf spring 19 frictionally mounted to the base portion thereof so that the resilient leg 19*a* of the bell crank 19 pushes the lefthand edge of the hooked arm 21 to rock the same slightly in a counterclockwise direction as shown in FIG. 8. As shown in FIGS. 7 and 8, the hook 21*a* of the arm 21 then will engage the upright portion 22 formed on the locking strip 10*a* to thereby maintain the same strip in its advanced position.

Then the release of the push button 8*a*″ permits the locking strip 10*a* to be returned back to its original position. Simultaneously the pendent arm 8*a*′ of the bell crank 8*a* forces the edge 19*c* of the forked leaf spring 19 (see FIG. 16) rearwardly so that the leaf spring 19 retracts from the position illustrated in FIG. 8 to the position illustrated in FIG. 7 while it frictionally slides on the locking strip 10*a*. Accordingly, the resilient leg 19*a* of the leaf spring 19 slips off the inclined edge 21*d* of the hooked arm 21 (see FIG. 7) to thereby release the lateral pressure applied to the arm 21. At the same time, the end of the other resilient leg 19*b* runs on the top of the angle-shaped projection 21*c* formed on the righthand edge of the hooked arm 21 whereby the latter tends to be turned in a clockwise direction rather than in the previous counterclockwise direction. However, since the upright portion 22 is resiliently engaged with the hook 21*b* by the tendency of the locking strip 10*a* to be returned back to its original position the relatively weak resilience of the resilient leg 19*b* can not disengage the upright portion 22 from the hook 21*b*. The operation as above described is to manually depress the push button 8*a*″ to engage the locking strip 10*a* with the hooked arm 21 and thereafter to release the push button 8*a*″ to rearwardly move the forked leaf spring 19. At the instant the locking strip 10*a* has been moved forwardly a switch (not shown) interlocking with the strip 10*a* is closed to allow an electric current to flow through the magnetic transducer head for recording.

After the completion of the operation as above described, the locking strip 10*a* has been merely moved forwardly to close the switch. The rotary disk is not yet started to rotate. When the push button 8*b*″ is depressed the locking strip 10*b* is advanced while the forward end thereof pushes the pendent portion 29*a* at the end of the bell crank 29. Simultaneously with the completion of forward movement of the locking strip 10*b*, the pendent portion 29*a* of the bell crank 29 will engage the stepped portion 16*a* formed at the end of the lever pivotably mounted on the rear surface of the base plate 1 as shown in FIG. 7. Upon forcing the locking strip 10*b* forwardly by the pendent portion 29*a* of the bell crank 29, the same drives the inclined portion 16*e* formed on the lever 16 (see FIG. 11) in the lefthand direction as viewed in FIG. 5. This causes rotational movement of the lever about its pivot in the counterclockwise direction. The release of the push button 8*b*″ allows the locking strip 10*b* to be returned back to its original position. However, as previously described, the counterclockwise rotational movement of the lever 16 causes the spring 17 extending upwardly from the end of the lever 16 to press against the lefthand edge of the locking strip 10*b* as shown in FIG. 7. Accordingly, the locking strip 10*b* tends to be rotated clockwise about the lower end 8*b*′ of the bell crank 8*b* against the action of the spring 12. This causes the locking strip 10*b* to be disposed in parallel to the locking strip 10*a* as shown in FIG. 7.

In this way the forward end of the locking strip 10*b* has pushed the pendent portion 29*a* of the bell crank 29 to rock the bell crank 29 clockwise about its pivot. At that time, the shaft 36 of the frictional transmission wheel 35 embraced by the V-shaped recess at the other end of the bell crank 29 is pulled along the elongated opening 37 formed on the base plate 1 by the compressive force of the spring 40. Thereby the outer periphery of the frictional transmission wheel 35 is brought into frictional contact with the inner surface of the pendent periphery of the rotary disk 3 on which the transducer head is carried whereby the disk starts to be rotated in the direction of the arrow shown in FIG. 7. It is to be understood that, by initially adjusting a knob shown in FIG. 1 to the mark "On," to thereby close a switch inserted between a source of electrical power and an electric motor, the rotational movement is effected by the motor thus energized. After initiation of rotational movement of the disk 3, the circular bar 56 pendent from the head supporting member 50 (see FIG. 13) is guided along the spiral groove on the circular disk 41 to be gradually displaced toward the center of convolution whereby the transducer head mounted to the head supporting member 50 records a magnetized track in the form of a spiral curve on the magnetic record sheet. Immediately before the circular bar 56 being guided by the grooved disk 41 reaches the inner end of the spiral groove the bar will disengage from the groove and is automatically returned back to its original position. This will be described hereinafter.

The description of how to stop rotational movement of the disk 3 for example during the recording operation, will now be made. With the locking strip 10*b* disposed parallel to the locking strip 10*a* as previously described (see FIG. 7 as compared with FIG. 5), the push button 8*b''* interlocking with the strip 10*b* is depressed. While the locking strip 10*b* tends to be rotated counterclockwise about the lower arm end 8*b'* of the bell crank 8*a* by the action of the spring 12 which engages the base portion of the strip 10*b* the same is prevented from rotating by the action of the spring 17 extending upwardly from one end of the lever 16 pivotably mounted to the base plate. The spring 17 tends to rotate the locking strip 10*b* in a clockwise direction and the pendent portion 14 formed on the righthand edge of the forward end of the locking strip 10*b* presses against the righthand edge of the opening 1*a* on the base plate 1. Therefore, the depression of the push button 8*b''* causes the locking strip 10*b* to be advanced from its position illustrated in FIG. 7 to a position illustrated in FIG. 9 where the pendent portion 14 of the locking strip 10*b* engages the stepped portion 1*a''* (see FIGS. 7 and 9) formed on the righthand edge of the opening 1*a* on the base plate 1. Thus the push button 8*b''* interlocking with the locking strip 10*b* remains depressed.

When the locking strip 10*b* is advancing it will move forwardly the side of the leaf spring 24 lying in the path of the upright portion 15 formed on the righthand edge of the strip, through that upright portion. As a result, the lever 23 to which the leaf spring 24 is secured is rotated clockwise about its pivot 124 until the pendent portion 23*c* on the lefthand end of the lever 23 strikes against the upper edge of the opening 1*c* on the base plate 1 as shown in FIG. 7. If the lever 23 is brought into the abovesaid position or its position illustrated in FIG. 9 then the upright portion 23*f* formed on the upper edge will approach the outer side of the pendent periphery of the rotatory disk 3 as shown in the same figure.

Figures 9, 12:
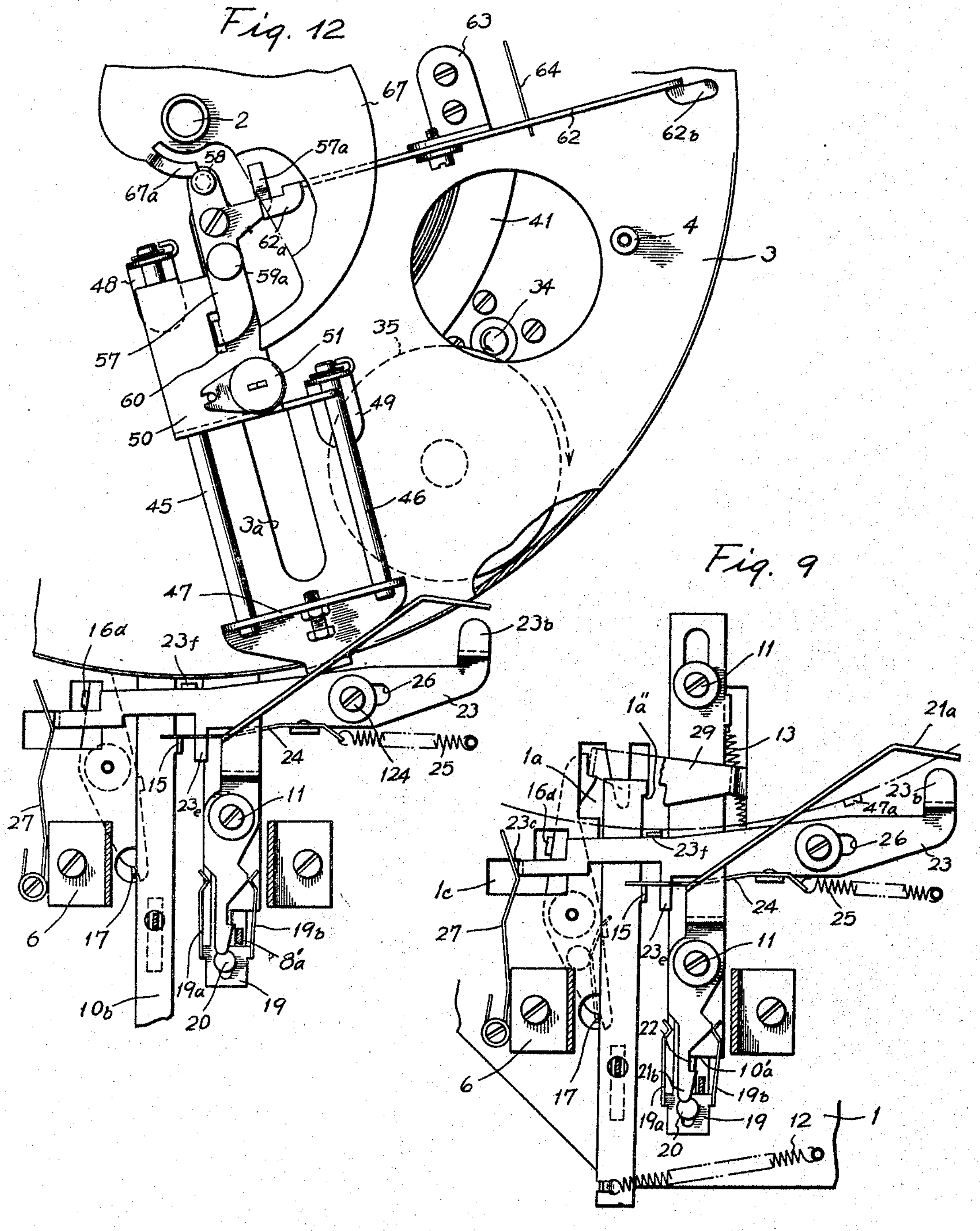
FIG. 9 is a plan view illustrating the mechanical elements of FIGS. 5 and 7 in still another state.
FIG. 12 is a fragmental plan view of a rotary disk in rotational movement and illustrating components associated therewith.

In FIG. 9 dotted-and-dashed arcuate line represents the outer periphery of the rotatory disk 3 and a dotted-and-dashed small rectangle 47*a* beside the arcuated line indicates the end of the pendent portion of the common bearing 47 as shown in FIG. 19. It is, therefore, appreciated that the upright portion 23*f* of the lever 23 is positioned within the path along which the pendent portion 47*a* of the common bearing 47 is moved. Accordingly, the pendent portion 47*a* integral with the rotatory disk 3 is rotated in the direction of arrow shown in FIG. 9 and strikes against the righthand edge of the upright portion 23*f* of the lever 23 to thereby force the lever toward the left. When the lever 23 is forced to the left the stepped edge formed on the lever adjacent the lefthand end presses against the internal surface of the upright portion 16*d* formed on the lefthand edge of the rocking lever 16 pivotally mounted on the rear surface of the base plate 1 to thereby rotate the rocking lever counterclockwise about its pivot. As a result, the pendent portion 29*a* of the bell crank 29 disengages from the end of the rocking lever 16 and the bell crank is rotated counterclockwise about its pivot until it is returned back to its original position (see FIG. 5). At the time the bell crank 29 has been returned back to its original position the notch 30 formed on the top of the angle-shaped extension of the bell crank engages the pendent portion 47*a* of the rotary disk as shown in FIGS. 5 and 19 to stop the rotational movement of the disk and to maintain the same in its inoperative position. More specially, when the engagement of the notch 30 with the pendent portion 47*a* occurs the frictional transmission wheel 35 disengages from the driving shaft 34 as shown in FIG. 5 because the bell crank 29 has been returned back to its original position. This interrupts the transmission of power to the disk 3.

As previously described, the lever 23 is forced toward the left as viewed in FIG. 9 and the upright portion 16*d* of the lever 16 is similarly forced to the left. Simultaneously, the lever 23 pushed to the left the upright portion 15 formed on the right hand edge of the locking strip 10*b*, through the projecting rod 23*e* formed on the lower edge of the lever 23. As a result, the pendent portion 14 formed at the forward end of the locking strip 10*b* disengages from the end portion of the lever 29 whereby the strip 10*b* can be returned back to its original position. If it is desired to again rotate the rotary disk the push button 8*b''* may be depressed to repeat the operation thus far described.

The operation of the transducer head when the pendent bar 56 of the head supporting member 50 is displaced adjacent the end of the spiral groove, while guided along the same or when the recording has been completed, will now be described. As already described, the transducer head has been energized with the desired information to be recorded and the push button 8*b''* has been depressed to rotate the rotary disk. As the disk 3 is rotated the head supporting member 50 is moved toward the center of convolution until, as shown in FIG. 12, the flat head rivet 58 secured at the end of the movable member mounted to the head supporting member will strike against the outer edge of the circularly arcuate piece 67*a* on the cam plate 67 secured to the fixed longitudinal shaft 2 at the top. Since the arcuate piece 67*a* extends obliquely and downwardly it is positioned beneath the flange 58*a* of the rivet 58 as shown in FIG. 13. Since the disk 3 continues to be rotated regardless of the collision of the flange 58*a* with the arcuate piece 67*a*, the lower surface of the flange 58*a* of the rivet 58 frictionally slides along the outer periphery of the arcuate piece 67*a* while the rivet 58 is raised along the inclined surface of the piece with the head supporting member 50 rotated about the cam plate 67. If the rivet 58 is displaced up to the base portion of the arcuate piece 67*a* the movable member 57 integral with the rivet 58 floats out of the head supporting member against the action of the spring 61 (see FIG. 13). Therefore, the lower end of the downwardly extending bar 56 integral with the movable member 57 is displaced above the spiral groove to thereby be put in a free state without the bar guided along the groove.

Since further rotation of the disk 3 causes the rivet 58 to be displaced along the operating periphery of the cam plate the head supporting member 50 is moved externally along the pair of cross rods 45 and 46. When substantially a complete rotation of the disk 3 is effected after the rivet 58 has landed at the cam plate, the rivet 58 disengages from the operating periphery of the cam plate. At that time, the movable member 57 having floated out of the head supporting member will be returned back to its original position in which the lower end of the bar 56 engages with the spiral groove. In FIG. 13 dotted-and-dashed line on the righthand end thereof shows the head supporting member being rotated about the cam plate and it is clearly seen that the movable member 57 floats out of the head supporting member 50 with the lower end of the bar 56 disengaging from the spiral groove.

It is desirable to automatically stop the recording operation at the time the transducer head has been returned back to its original position. Therefore, the present invention is contemplated to stop the recording operation by interlocking the locking strip 10*a* with the transducer head when the head has reached adjacent the center about which the rotary disk is rotated. The mechanism for automatically stopping the recording operation will now be described.

As the disk 3 is continued to be rotated the head supporting member 50 is moved from its position illustrated in FIG. 4 toward the center of the convolutions along the cross rods 45 and 46 and approaches its position illustrated in FIG. 12. Immediately before the head supporting member 50 reaches the latter position, the end of the arm portion 57*a* extending from the righthand edge of the movable member 57 mounted on the supporting member 50 for vertical displacement will land the lefthand arm end 62*a* of the lever 62 rockably mounted on the rotary disk (see FIG. 12). Then the rivet 58 carried by the movable member 57 will run on the periphery of the cam plate in the manner similar to that above described. This causes the movable member 57 to float out of the head supporting member 50 whereby the left arm end 62*a* of the lever 62 is raised against the action of the spring 64 engaging the lever. By raising the left arm end 62*a* of the lever 62 it is rotated clockwise about its pivot and the right arm end 63*b* of the lever is lowered. The righthand end 62*b* of the lever 62 is normally passed above the arm portion 21*a* extending from the hooked arm 21 to a space above the rotary disk. However, once the righthand end 62*b* of the lever 62 has been lowered, said end is maintained in a state where it kicks off the inclined surface of the angle shaped portion formed at the end of the arm portion 21*a* due to the rotational movement of the disk 3. When the disk 3 has been rotated by substantially 90 degrees in such a state the righthand end 62*b* of the lever 62 kicks off the inclined surface of the angle shaped portion formed at the end of the arm portion 21*a* or the extension of the hooked arm 21, externally of the rotatory disk. As a result, the hooked arm 21 is rotated clockwise about its pivot to disengage the hook 21*b* at the other end of the same from the upright portion of the locking strip 10*a*. Therefore, the locking strip 10*a* is returned back to its original position illustrated in FIG. 5, because of its tendency to do so. Simultaneously the transducer head is deenergized.

After the extending arm portion 21*a* of the lever 21 has been kicked off and if the push button 8*b*″ is depressed as previously described to advance the locking strip 10*b* from its position illustrated in FIG. 7 to its position illustrated in FIG. 9 then the upright portion 23*f* formed on the upper edge of the lever 23 is positioned in the passage along which the pendent portion 47*a* projecting beyond the outer periphery of the disk 3 is moved. As thus so far described the returning-back of the transducer head to its original position through the cam plate effects automatic deenergization of the head and simultaneously interruption of the rotational movement of the rotary disk.

The description will now be set forth as to the operation by which the transducer head is deenergized during the rotational movement of the disk 3.

By depressing the push button 8*a*″ the locking strip 10*a* already positioned in the advanced position as illustrated in FIG. 7 is applied with a force which tends to further advance the same through the lower arm end 8*a* of the bell crank 8*a* to thereby relax the engagement of the upright portion 22 of the locking strip 10*a* with the hook 21*b*. Then the hooked arm 21 which tends to be rotated clockwise by the resilient action of the leg 19*b* of the forked leaf spring 19 is rotated clockwise whereby the upright portion 22 disengages from the arm portion 21*b*. This allows the locking strip 10*a* to be returned back to its original position illustrated in FIG. 5.

While the invention has been described in relation to the recording operation, the respective operations and results of the two bell cranks 8*a* and 8*b* will now be summarized. If it is desired to perform the recording operation the push button 8*a*″ is depressed to electrically energize the transducer head and subsequently the push button 8*b*″ is depressed to rotate the rotary disk 3. If it is desired to stop the rotational movement of the rotary disk during the recording operation the push button 8*b*″ can be again depressed to render the disk stationary. Also, if it is desired to deenergize the transducer head with the rotatory disk rotated the push button 8*a*″ can be again depressed. Thus each of the push buttons can perform two functions.

The description will now be set forth as to reproduction from a magnetic record sheet. To reproduce a desired information from a magnetically recorded sheet the sheet is disposed on the top plate of the housing and then the push button 8*b*″ is depressed to initiate the rotational movement of the rotary disk 3 on which the transducer head is carried as in the recording operation. In this case the push button 8*a*″ need not be used. In other words, when the locking strip 10*a* interlocking with the push button 8*a*″ is in its inoperative position as illustrated in FIG. 5 an audio current from the transducer head is passed through an amplifier to a loudspeaker. With the locking strip 10*a* in its advanced position (or in the case of recording operation), the electrical circuit for reproduction is converted to one for recording. If it is desired to stop the reproduction before the completion thereof the push button 8*b*″ can be again depressed to stop the rotational movement of the rotary disk as in the recording operation.

The description will now set forth the operation relative to recording on or reproduction from a magnetic record sheet at any desired point.

The circular plate 5 horizontally mounted to the disk 3 above the same in any suitable manner is provided with a radial slot 5*a* (see FIG. 1) corresponding in longitudinal length to a range within which the transducer head may be moved toward and away from the center of convolution. The radial slot 5*a* is dimensioned such that the knob 59*a* of the movable member 57 mounted to the head supporting member 50 for vertical displacement can be manually adjusted in radial position through the slot. Therefore, if the knob 59*a* is manually displaced upwardly as viewed in FIG. 13 the lower end of the bar 56 carried by the movable member 57 is separated from the spiral groove on the disk 41 whereby the head supporting member 50 can be brought into any desired position along the cross rods 45 and 46 mounted on the rotary disk.

As previously described the present invention uses only a pair of locking strips capable of performing multiple operations. Therefore, the invention is very advantageous in that complicated cumbersome manipulations are avoided because of the absence of various locking strips, one for each manipulation, on the surface of a housing for a magnetic recording and reproducing apparatus and the apparatus can be made small and inexpensively manufactured because of the absence of many juxtaposed locking strips. Moreover, the provision of a cam plate such as previously described causes a transducer head to be automatically returned back to its original position upon the termination of recording or reproducing operation and hence the invention is very convenient.

While the invention has been described in conjunction with the preferred embodiment thereof it is to be understood that various changes and modifications may be made without departing from the spirit and scope of the invention.

What I claim is:

A magnetic recording and reproducing apparatus comprising, an electrically energized electromagnetic recording and reproducing transducer head for recording on a magnetizable record medium, means for immovably holding a flat magnetizable record medium for recording thereon and for reproducing the recording therefrom with said transducer head, means comprising a disk for transporting said transducer head while recording and reproducing and for causing in operation said transducer head to travel along a spiral path relative to said record medium while recording and reproducing, means to automatically restore said transducer head directly to a start position when the transducer head reaches a terminal position of its spiral travel corresponding substantially with the center of a spiral along which said transducer head travels, and means comprising a single operating member actuatable manually for initiating energization of said transducer head and operable in the same direction for initiating deenergization of said transducer head.

References Cited

UNITED STATES PATENTS

| | | | |
|---|---|---|---|
| 2,554,347 | 5/1951 | Rouse | 274—13 |
| 2,915,596 | 12/1959 | Lyon et al. | 179—100.2 |
| 2,929,633 | 3/1960 | Hoshino et al. | 179—100.2 |
| 3,210,082 | 10/1965 | Murata | 179—100.2 |
| 3,214,175 | 10/1965 | Nakamatsu | 274—4 |

BERNARD KONICK, *Primary Examiner.*

J. R. GOUDEAU, J. BREIMAYER, *Assistant Examiners.*